United States Patent
Li (10) Patent No.: US 6,730,145 B1
(45) Date of Patent: May 4, 2004

(54) TREATING GAS SEPARATION MEMBRANE WITH AQUEOUS REAGENT DISPERSION

(75) Inventor: Tao Li, Mount Laurel, NJ (US)

(73) Assignee: L'Air Liquide Societe Anonyme, Paris Cedex (FR)

( * ) Notice: Subject to any disclaimer, the term of this patent is extended or adjusted under 35 U.S.C. 154(b) by 65 days.

(21) Appl. No.: 10/334,305

(22) Filed: Dec. 31, 2002

Related U.S. Application Data (60) Provisional application No. 60/352,644, filed on Jan. 29, 2002.

(51) Int. Cl.$^7$ .......................... B01D 53/22; B01D 69/08
(52) U.S. Cl. ............................... 96/10; 96/12; 55/524; 55/DIG. 5; 427/245
(58) Field of Search ............................... 55/524, DIG. 5; 96/8, 10, 12, 13; 427/230, 245

(56) References Cited

U.S. PATENT DOCUMENTS

| | | | | |
|---|---|---|---|---|
| 4,080,744 A | | 3/1978 | Manos | 34/9 |
| 4,120,098 A | | 10/1978 | Manos | 34/9 |
| 4,230,463 A | | 10/1980 | Henis et al. | 55/16 |
| 4,472,175 A | | 9/1984 | Malon et al. | 55/16 |
| 4,484,935 A | | 11/1984 | Zampini | 55/158 |
| 4,486,376 A | | 12/1984 | Makino et al. | 264/342 R |
| 4,527,999 A | * | 7/1985 | Lee | 210/654 |
| 4,575,385 A | | 3/1986 | Brooks et al. | 55/158 |
| 4,634,531 A | | 1/1987 | Nakagawa et al. | 210/639 |
| 4,654,055 A | | 3/1987 | Malon et al. | 55/158 |
| 4,751,104 A | | 6/1988 | Kulprathipanja et al. | 427/57 |
| 4,764,320 A | * | 8/1988 | Chau et al. | 264/41 |
| 4,767,422 A | * | 8/1988 | Bikson et al. | 95/51 |
| 4,784,880 A | * | 11/1988 | Coplan et al. | 427/245 |
| 4,863,496 A | | 9/1989 | Ekiner et al. | 55/158 |
| 4,877,421 A | * | 10/1989 | Bikson et al. | 95/45 |
| 4,968,533 A | * | 11/1990 | Gsell | 427/245 |
| 5,032,149 A | | 7/1991 | Hayes | 55/16 |
| 5,034,024 A | | 7/1991 | Hayes | 55/16 |
| 5,049,167 A | * | 9/1991 | Castro et al. | 95/55 |
| 5,091,216 A | | 2/1992 | Ekiner et al. | 427/245 |
| 5,160,353 A | | 11/1992 | Gochanour | 55/158 |
| 5,258,203 A | * | 11/1993 | Arthur | 427/245 |
| 5,320,512 A | | 6/1994 | Moore, Sr. | 425/131.5 |
| 5,409,524 A | * | 4/1995 | Jensvold et al. | 96/8 |
| 5,868,992 A | * | 2/1999 | Roman | 264/340 |
| 6,156,381 A | * | 12/2000 | Leong et al. | 427/244 |
| 6,355,081 B1 | * | 3/2002 | Wang et al. | 55/524 |

FOREIGN PATENT DOCUMENTS

| | | |
|---|---|---|
| EP | 0107636 A1 | 5/1984 |
| EP | 0179474 A2 | 4/1986 |
| EP | 0242069 A2 | 10/1987 |
| JP | 57-94307 | 6/1982 |
| JP | 1-123617 | 5/1989 |
| JP | 1-123618 | 5/1989 |

* cited by examiner

Primary Examiner—Robert H. Spitzer (57) ABSTRACT

A method of post treating gas separation membranes to seal porous defects that are initially produced in an ultra thin selectively gas permeable layer of the membrane involves contacting the defect-bearing section of the membrane with a suspension containing caulking particles dispersed in an aqueous medium. The caulking particles are composed of curable polymer having functional groups that can react with each other and/or the membrane composition in absence of water. The water of suspension is removed and the polymer of the caulking particles is cured to seal the defects and render the membrane highly effective for gas separations. Low surface tension of the suspension can be enhanced by incorporating a surfactant and allows asymmetric membranes to be dried directly from water wet to dry state, for example by evaporation, without excessive densification of porous portions of the membrane.

16 Claims, 1 Drawing Sheet

TREATING GAS SEPARATION MEMBRANE WITH AQUEOUS REAGENT DISPERSION

This application claims priority of U.S. Provisional Application 60/352,644 filed Jan. 29, 2002.

FIELD OF THE INVENTION

This invention relates to gas separation membranes having porous defects that are sealed with caulking particles so as to improve gas separation performance of the membranes. More specifically, it relates to a process of healing the defects in asymmetric gas separation membranes by contacting the skin of the membrane with an aqueous suspension of curable polymeric caulking particles, removing water of suspension and curing the polymer of the particles to seal the defects.

BACKGROUND OF THE INVENTION

Gas separation membranes of selectively gas permeable materials are well known and commercially important devices for separating the components of gas mixtures in many industries. These membranes can have many physical forms such as tubes and flat, pleated or spiral wound films. Membranes in the form of small diameter hollow fibers are particularly valued mainly because they can be assembled in bundles within modules that provide very high gas transfer surface area within extraordinarily small module volume.

Because thinner membranes provide higher the membrane flux than thicker membranes of the same selectively gas permeable composition, there is a strong incentive to make the selectively gas permeable portion (sometime herein, "the active layer") of hollow fiber membranes ultra thin. A favored technique involves forming an asymmetric structure in which the active layer is a thin, dense stratum positioned coextensively adjacent to a somewhat porous and usually much thicker stratum, occasionally referred to herein as a "support layer". When positioned on a surface of the membrane, the active layer is sometimes referred to as a "skin". The support layer provides negligible selectivity because the gas mixture to be separated passes freely through the porous structure. Beneficially, flow through the support layer is less restricted because the pores provide little resistance to transmembrane gas flow despite the comparatively greater support layer thickness. As the thickness of the active layer is typically about a few hundred to a few thousand angstroms, an asymmetric membrane structure provides an overall good balance of gas flow and selectivity.

In striving to reduce the thickness of the active layer, most fabricators use methods which make the active layer so thin that porous defects normally form in the layer. Defects can also be formed as a consequence of handling the hollow fiber during fabrication steps such as washing, dehydration, drying and bobbin winding. While it is difficult to quantify these defects, they may be generally characterized as being less than about 50 Angstroms in size.

If not repaired, the defects provide passages directly through the selectively gas permeable material. These defects thus dramatically reduce the membrane selectivity compared to selectivity that would be obtained from a continuous layer of the selectively permeable material. Defects occupying typically only as much as about $10^{-5}$–$10^{-6}$ fraction of the membrane surface can render a membrane useless for selective gas separation purposes.

Conventional methods of gas separation membrane manufacture sometimes call for so-called "post-treatment" processing in which the defects are effectively caulked with certain sealant materials. Generally such post-treatment procedures involve dissolving a polymeric sealant in an organic solvent, causing the resulting solution to at least partially coat the defective membrane surface and penetrate the porous defects. The solvent is removed leaving the polymeric solute occluding the pores.

U.S. Pat. No. 4,230,463 discloses methods of coating porous hollow fiber membranes with liquid coating material to provide a separation factor greater than either that of the uncoated hollow fiber membrane or the coating material. The methods call for dipping the porous membrane in the undiluted liquid coating material or in a solution of the liquid coating material dissolved in a hydrocarbon solvent.

EP 0 242 069 teaches a method of forming a semipermeable composite membrane by applying an aqueous emulsion of curable silicone (polyorganosiloxane) onto a porous substrate, evaporating the water, coalescing the siloxane particles and crosslinking the siloxane to form a continuous film of polyorganosiloxane over the porous substrate. A surfactant can be used to stabilize the polymer precursor droplets in the aqueous emulsion The method is useful for forming separation membranes on organic solvent sensitive substrates. It does not suggest to caulk defects in a preformed ultra thin separation membrane.

Japanese Patent Publication JP 57094307 discloses the procedure of contacting a dry composite semipermeable membrane with an aqueous solution of generally amphoteric surfactant or nonionic surfactant to increase the water permeability of the dry composite membrane.

Japanese Patent Publication JP 1123617 discloses the method of eliminating minute defects in composite membranes of a selectively gas permeable layer deposited on a sheet or hollow yam porous substrate. The method calls for applying surfactants having at most 30 dynes/cm surface tension, and preferably bearing perfluoroalkyl groups onto the membrane. The surfactant can be dissolved in water and the membrane is dipped in the surfactant solution to contact the selectively gas permeable layer with the surfactant.

U.S. Pat. No. 4,575,385 discloses asymmetric gas separation membranes treated with certain aromatic permeation modifiers. A disclosed method of treating the membrane calls for dipping a hollow fiber membrane for about 10 seconds in an aqueous methanol solution containing 2 wt. % of the permeation modifier while applying vacuum to the bore of the hollow fiber.

U.S. Pat. No. 5,034,024 discloses the process of improving permselectivity of asymmetric aromatic polyimide gas separation membranes entailing contacting the membrane with a nonsolvent mixture for the membrane, preferably including a swelling agent, and containing a surfactant. The use of nonionic amine ethyloxylate and alcohol ethoxylate surfactants dissolved in aqueous solutions is disclosed.

EP 0 107 636 teaches that an anisotropic porous substrate, preferably a hollow fiber, can be coated with the condensation product of silanol terminated poly(dimethylsiloxane) and a specified cross linking agent having particularly identified characteristics.

EP 0 179 474 discloses treating an aromatic polyamide or amide-like polymer membrane with a dilute solution of a cationic surfactant in a volatile non-polar organic solvent of low surface tension to provide improved selectivity with respect to gas separation of two gases selected from among carbon dioxide, methane and helium.

U.S. Pat. No. 4,472,175 discloses the method of contacting one or both surfaces of a preformed selectively gas permeable asymmetric separation membrane with an effective amount of a Brønsted-Lowery acid and thereby increasing the separation factor of the membrane relative to the separation factor exhibited prior to such contacting.

U.S. Pat. No. 4,484,935 teaches the method of preparing a multicomponent selectively gas permeable hollow fiber membrane having preferably a porous polysulfone substrate onto which is coated a condensation product of silanol-terminated poly(dimethyl siloxane) and a permeation modifying radical selected from among 15 specified radicals. The coating is applied to the substrate in the form of a solution of the coating material dissolved in a solvent such as pentane.

In U.S. Pat. No. 4,486,376 it is disclosed to treat a porous polymeric gas separation membrane with a volatile liquid containing a modifying agent. The modifying agent is either a volatile organic liquid capable of dissolving at least 1% of the porous membrane at 25° C. or a volatile organic liquid capable of causing the porous membrane to shrink by at least 3%.

U.S. Pat. No. 4,634,531 discloses the method of treating a semipermeable membrane in two steps, firstly with an aqueous solution of a water soluble compound, primarily polyfunctional amines, and secondly with an aqueous solution of another water soluble compound, primarily polyfunctional aldehydes, the two compounds being such that when contacted with each other they make water insoluble or very slightly water soluble materials. The membranes being treed consist of cross-linked polymers based on furfuryl alcohol monomer and also polyamide and polyurea membranes. The membranes are largely used for reverse osmosis utilities.

U.S. Pat. No. 4,751,104 teaches a method of preparing gas separation membranes which includes coating a porous support membrane with an emulsion or solution of a polymer dissolved in a solvent and a plasticizer for the polymer. Preferably the emulsion or solution is drawn into the porous support membrane under vacuum to increase penetration and the solvent is evaporated at elevated temperature. Fluorinated hydrocarbon solvents are disclosed.

In U.S. Pat. No. 4,863,496 it is taught to improve the selectivity of asymmetric gas separation membranes having a wide range of hole sizes by controlled application of a reactive monomer within or on the surface of the membrane. The monomer can be diluted in a noninteracting fluid. After application, the monomer is reacted to form a polymer effectively sealing defects and imperfections in the membrane. Monomers in organic solvents are disclosed.

Despite many efforts, it is still desirable to have a very effective gas separation membrane that provides the combination of high permeance and high selectivity for gas mixtures and especially for separating oxygen and nitrogen gas mixtures. To consistently and reliably fabricate such a membrane, it is desired to have a procedure that permits repair of minute porous defects of a thin active separation layer without significantly increasing active layer thickness and thereby decreasing permeate flux. That is, a suitable repair method would offer the ability to make an active layer so thin that it unavoidably contains correctable defects. There also thus remains a great need for a method of post treating a pre-formed selectively permeable gas separation membrane to repair a very low surface concentration of minute porous defects in an otherwise continuous very thin active, selectively permeable layer of a gas separation membrane. Moreover, it is desirable to have a porous defect repair method that utilizes an aqueous medium and preferably avoids use of volatile organic compounds which can be hazardous to handle or environmentally repugnant to dispose of.

Accordingly, the present invention provides a method of repairing porous defects in a selectively gas permeable portion of a gas separation membrane comprising providing a suspension comprising caulking particles of a curable polymer dispersed in an aqueous solution, contacting the portion of the membrane having the porous defects with the suspension, removing water of the suspension from the membrane, and heating the caulking particles and membrane to an elevated temperature for a duration effective to cure the polymer, thereby causing the polymer to seal the porous defects.

The invention further provides a method of repairing porous defects in the selectively gas permeable portion of a gas separation membrane which is an asymmetric hollow fiber having an annular cross section comprising a porous part and a substantially nonporous selectively gas permeable part radially adjacent to the porous part and in which the step of removing water comprises drying the membrane directly to a dry state without replacing the water with a non-aqueous liquid prior to obtaining the membrane in the dry state.

This invention additionally provides a hollow fiber gas separation membrane having an asymmetric structure defined by an annular cross section comprising a porous part and a substantially nonporous selectively gas permeable part radially adjacent to the porous part in which the selectively gas permeable part comprises a plurality of porous defects occluded by cured caulking particles of a curable polymer.

There is also provided a gas separation membrane having an asymmetric structure defined by a dense selectively gas permeable skin comprising sealed porous defects the membrane being formed by a method comprising providing a suspension comprising caulking particles of a curable polymer dispersed in an aqueous solution, contacting a portion of the membrane having porous defects with the suspension, removing water from the suspension, and heating the caulking particles and membrane to an elevated temperature for a duration effective to cure the polymer, thereby causing the polymer to seal the porous defects.

DETAILED DESCRIPTION OF THE INVENTION

The present invention relates to the so-called "post treatment" aspect of the fabrication of gas separation membranes. Post treatment processing occurs at a later stage in the manufacture of the finished membrane, and particularly after a thin, active layer of selectively gas permeable material has been formed. Post treatment processing refers to the repairing of porous defects in the selectively gas permeable layer. It is not intended to perform the primary step of applying a selectively gas permeable material onto a non-selectively permeable porous substrate. Because a post treatment process is available to seal the minute and relatively few defects that may form when an otherwise continuous active layer is made very thin, the fabricator can produce a membrane with an active layer so thin that it will have some defects. Therefore, post treatment enables production of ultra tin active layer gas separation membranes. Post treatment also permits the fabricator to employ useful process techniques and equipment that can handle the delicate membrane rigorously and thus may unfortunately contribute to defect formation.

The novel post treatment process can be used to fabricate gas separation membranes of various shapes including hollow fibers and flat sheets which may optionally be further shaped to form spiral wound, pleated, ribbon tube, and like configurations. Hollow fiber membranes are preferred. Such fibers are generally tubular in form and have an outside diameter of about 75 to about 1000 $\mu$m, preferably about 100 to about 400 $\mu$m, and more preferably about 125 to about 250 $\mu$m. The wall thickness can be in the range of about 25 to about 300 $\mu$m, and preferably about 25 to about 75 $\mu$m. Preferably the diameter of the bore, i.e., the inner diameter of the fiber, is about one-third to about three-quarters of the outside diameter and will preferably lie in the range of about 50 to about 200 $\mu$m and more preferably about 60 to about 150 $\mu$m.

Gas separation membranes with a thin selectively gas permeable (i.e., "active") layer having defects to be sealed by the post treatment process have various configurations. One is a so-called "composite membrane" in which the active layer is positioned coextensively adjacent to a structurally supportive and usually porous substrate. In a composite membrane the active layer and the substrate are not partial elements of a single, monolithic layer. They usually are produced by laying up one layer on another, such as by laminating two separate layers. The substrate can be a selectively gas permeable material but typically is not. As mentioned, due to porosity the substrate has negligible gas separation properties and presents little resistance to trans-membrane flux. The substrate primarily provides structural integrity for the active layer which is by itself normally too thin to form a self supporting film or to withstand the pressure gradient across the membrane imposed during routine operation.

A preferred type of membrane is known as an asymmetric membrane. This membrane is characterized by an anisotropic structure in cross section normal to direction of permeate flow. Typically an asymmetric membrane has an active layer constituted by a continuous, dense thin skin at one surface and a porous, usually thicker support layer coextensively adjacent to the skin and tending to be increasingly porous with distance from the skin. The active layer and support layer of the asymmetric membrane are usually composed of the same selectively gas permeable substance. The skin is usually less than 1/10th of the thickness of the asymmetric membrane. Typically, the thickness of the skin is about 50–3000 Å, preferably about 50–1500 Å and more preferably about 50–1500 Å. The asymmetric membrane can be either monolithic or composite. That is, in a monolithic asymmetric membrane the active layer and support layer are parts of an integrated monolithic structure. In a composite asymmetric membrane, the asymmetric membrane includes a substrate adjacent to the asymmetric membrane layer. For example, a typical hollow fiber composite membrane can be formed by an annular core of a porous substrate surrounded by a coaxial annular sheath of the asymmetric membrane. In a composite asymmetric membrane the non-active layer of the asymmetric membrane and the substrate layer are sometimes collectively referred to as the "support layer". The asymmetric membrane layer and the substrate typically have different compositions.

Materials used for gas separation membranes are frequently polymeric. A diverse variety of polymers can be used for the supportive substrate of a composite membrane. Representative substrate polymers include polysulfones, polyether sulfones, polyamides, polyimides, polyetherimides, polyesters, polycarbonates, copolycarbonate esters, polyethers, polyetherketones, polyvinylidene fluoride, polybenzimidazoles, polybenzoxazoles, cellulosic derivatives, polyazoaromatics, poly(2,6-dimethylphenylene oxide), polyarylene oxide, polyureas, polyurethanes, polyhydrazides, polyazomethines, cellulose acetates, cellulose nitrates, ethyl cellulose, brominated poly(xylylene oxide), sulfonated poly(xylylene oxide), polyquinoxaline, polyamideimides, polyamide esters, blends thereof, copolymers thereof, substituted materials thereof and the like. This should not be considered limiting since any material which can be fabricated into an anisotropic substrate membrane may find utility as the substrate layer of the present invention. Preferred materials for the substrate layer include polysulfone, polyethersulfone, polyetherimide, polyimide, polyamide compositions and copolymers and blends thereof.

The active layer is preferably also a polymer and is usually chosen to provide high flux and selectivity with respect to components of a gas mixture which is desire to be separated. The range of gas mixture suitable for separation by selectively permeable membranes is very broad. Some gas mixtures which present a high degree of industrial utility include, for example, $He/N_2$, $O_2/N_2$, $CO_2/CH_4$ and $H_2/CH_4$. Many other gas mixture compositions can be used.

A wide range of polymeric materials have desirable selectively gas permeating properties and can be used in the active layer. Representative materials include polyamides, polyimides, polyesters, polycarbonates, copolycarbonate esters, polyethers, polyetherketones, polyetherimides, polyethersulfones, polysulfones, polyvinylidene fluoride, polybenzimidazoles, polybenzoxazoles, polyacrylonitrile, cellulosic derivatives, polyazoaromatics, poly(2,6-dimethylphenylene oxide), polyphenylene oxide, polyureas, polyurethanes, polyhydrazides, polyazomethines, polyacetals, cellulose acetates, cellulose nitrates, ethyl cellulose, styrene-acrylonitrile copolymers, brominated poly(xylylene oxide), sulfonated poly(xylylene oxide), tetrahalogen-substituted polycarbonates, tetrahalogen-substituted polyesters, tetrahalogen-substituted polycarbonate esters, polyquinoxaline, polyamideimides, polyamide esters, blends thereof, copolymers thereof, substituted materials thereof, and the like. In addition, suitable gas separating layer membrane materials may include those found useful as the dense separating layer of composite gas separation membranes. These materials include polysiloxanes, polyacetylenes, polyphosphazenes, polyethylenes, poly(4-methylpentene), poly(trimethylsilylpropyne), poly (trialkylsilylacetylenes), polyureas, polyuretanes, blends thereof, copolymers thereof, substituted materials thereof, and the like. Preferred materials for the dense gas separating layer include aromatic polyamide, aromatic polyimide compositions, polysufone, polyether sulfone and blends thereof.

In one aspect, the present invention relates to a method of sealing the porous defects in the active layer of a gas separation membrane. Broadly stated, the method includes the steps of contacting a portion of the membrane having the porous defects with a suspension comprising caulking particles of a curable polymer dispersed in aqueous solution, to bring the caulking particles proximate to the porous defects, removing the water from the suspension, and heating the caulking particles and membrane to a curing temperate for a duration effective to seal the porous defects.

Fundamental to the practice of this method is the use of a suspension formed by dispersing caulking particles of a curable polymer in aqueous solution. The term "suspension" is used broadly herein to mean a dispersion of a solid in a liquid or an emulsion of liquid droplets in another liquid with which the liquid of the droplets is immiscible. Accordingly, the term "suspension" is deemed to appropriately describe dispersions of polymer molecule aggregates in aqueous media without regard to defining whether the polymer molecule aggregates are solid or liquid.

The curable polymer ultimately is responsible for sealing the porous defects. The term "curable polymer" means an uncrosslinked polymer composition sometimes called a "green" composition defined by having substituent functional groups such as —OH which under anhydrous conditions can react to crosslink the polymer. The functional groups are such that crosslinking does not readily occur in the presence of free water. The caulking particles are composed of molecules of curable polymer. In the uncrosslinked state, the caulking particles are swollen, pliant and deformable and are thus adapted to conform to irregularities in the surface of the defect bearing active layer. After removal of the water of suspension, the curable polymer can be crosslinked by reaction of the functional groups. Crosslinking of the curable polymer causes the caulking particles to form a three-dimensional rubbery network which is significantly less pliant than the uncrosslinked particle. Thus the cured caulking particles maintain a substantially fixed shape and become permanently lodged in the defects of the membrane. Representative curable polymers include styrene-butadiene copolymer emulsion available as an anionic aqueous polymer dispersion of 53 wt. % solids in water from Noveon, Inc. under the tradename Good-Rite SB-1168, aliphatic polyurethane available from Noveon, Inc. as an anionic dispersion of 40 wt. % solids in water under the tradename Sancure 861, aromatic polyurethane available from Noveon, Inc. as an anionic dispersion of 36 wt. % solids in water and N-methyl-2-pyrrolidone ("NMP") solution available under the tradename Sancure 1591, reactive silicone polymer having as its active ingredient aminoethyl aminopropyl siloxane hydroxy stopped [formula: {HO ((NH$_2$CH$_2$CH$_2$)(NH$_2$CH$_2$CH$_2$CH$_2$)SiO)$_x$—H)} in which x>1] and available as a cationic dispersion of 35–41 wt. % solids in water from General Electric Co. under the tradename SM2059, an hydroxy-terminated reaction product of dimethyl, methyl((dimethylamino)oxy)siloxane with dimethyl siloxane available from Dow Corning Co. under the tradename Allguard silicone elastomeric coating-pastel tint base, and diamino/alkoxy reactive silicone emulsion having as its active ingredient (aminoethyl aminopropyl) methoxy siloxane/dimethyl siloxane copolymer [formula: {(CH$_3$)$_3$SiO—((NH$_2$C$_2$H$_4$NHC$_3$H$_6$)(CH$_3$O)SiO)$_m$—((CH$_3$)$_2$SiO)$_p$Si(CH$_3$)$_3$} where m and p are each >1] available as a cationic dispersion of 50 wt. % solids in water from Gelest, Inc. under the tradename ATM$_{1322}$M$_{50}$. Another useful curable polymer is a copolymer of hydroxy-terminated dimethyl siloxane and 3-[(2-aminoethyl)amino]propyl silsesquioxanes of the following formula in which R is an aminoethylaminopropyl group.

It is a distinctive feature of this invention that the medium for suspension of the caulking particles is an aqueous medium. In certain embodiments, the liquid of suspension is a solution of water and other liquids miscible with water in which a large fraction, i.e., about 30–100 wt. %, and preferably, a major fraction, that is, about 50–100 wt. % of the liquid of suspension is water. Preferably the liquid of suspension is 100% water. Use of a suspension medium containing water provides several advantages. Firstly, water inhibits the cross linking of curable polymer and this prevents the caulking particles to cure until the particles have approached the defects and the water of suspension has been removed. Secondly, use of water largely reduces and in many cases completely eliminates the incorporation of volatile organic solvent in the process of making the membrane. Consequently there is a lower safety risk from hazed or personnel exposure to flammable and/or toxic materials. Thirdly, absence of organic solvents avoids added expense and lost productivity of treating waste products to render them environmentally benign prior to disposal from the membrane fabrication process.

Notwithstanding the preceding discussion, it should be recognized that some curable polymers suitable for use in this invention are commercially available in the form of caulking particles in aqueous dispersions that may contain non-aqueous liquid components. For example, Sancure 1591 is a commercial formulation believed to contain polymer dispersed in water with NMP added to assist forming the dispersion.

The caulking particles are combined with the aqueous medium and mixed to provide a substantially uniformly dispersed suspension. Conventional mixing methods for dispersing fine particulates in liquids such as agitating with a high shear rate inducing impeller or sonicating with ultrasonic devices can be used. The suspension is brought in contact with the surface of the active layer having defects. In this step of the process the caulking particles are brought near to the porous defects. It is acceptable to merely wet the surface with the suspension. For example the surface can be placed in a container and a stagnant pool of suspension can be poured onto the surface. Similarly, the surface can be dipped into a pool of suspension. Preferably the suspension should be processed to enhance contact of the caulking particles with the defect-bearing surface. For example, the suspension can be agitated by shaking the container holding the membrane and suspension, by mechanically stirring the suspension, by recirculating the suspension across the surface or similar techniques.

Preference is given to applying a pressure gradient across the suspension and the membrane such that pressure on the suspension side of the membrane is greater than the pressure on the side of the membrane opposite the suspension. Such processing can promote plugging of the defects by the particles in the suspension. This can be accomplished by applying positive pressure to the suspension, by applying a negative pressure, e.g. vacuum to the opposite side or by both. If the membrane is configured as a flat sheet, it can be held in a frame adapted to mate with an open window of a chamber containing the suspension so that the defective skin surface of the membrane faces the suspension. While biasing the frame against the window, pressure in the chamber can be increased. Alternatively, on the side opposite the defective skin surface, the frame can have a chamber with a suction port. A vacuum source is connected to the port while the surface of the membrane is in contact with suspension through the window and thus the particles are drawn close to the membrane. If the membrane is configured as a tube or hollow fiber, it can be mounted in an elongated module. The space inside such hollow membrane structures is called the "bore" and collectively, the space inside the bores of multiple hollow membrane structures connected in parallel flow communication within a module is referred to as the "tube side". The space outside the hollow membrane structures and inside the case of the module is called the "shell side". The suspension is charged into the tube side or shell side of the module depending upon whether the skin surface having defects is on the inner or outer surface of the fiber. The tube side or shell side containing the suspension is then pressurized and/or the opposite side of the module is evacuated. Preference is given to drawing a vacuum on the side of the module opposite the suspension. This is found useful to cause the caulking particles to effectively plug the defects.

Due to fluid flow induced by the pressure gradient, the caulking particles, to some extent lodge in the defects. The particles may be larger than the defects. It is sufficient for the caulking particles to penetrate slightly beyond the threshold of the defects. Complete insertion of the particles into the defects is acceptable but not necessary as long as the caulking particles bridge over and occlude the entrance of the pores. Preferably the pressure differential across the suspension should be about 5–100 KPa and preferably about 15–70 KPa. The pressure gradient should be imposed for a duration effective to allow the caulking particles to contact the surface, adsorb onto the walls of the defects, and to insert into the pores. Preferably the pressure gradient is maintained for about 1–600 minutes, and more preferably for about 10–240 minutes.

After the uncured caulking particles contact and preferably penetrate the porous defects, the aqueous suspension and residual water are removed. This is accomplished by first decanting, draining or otherwise conventionally separating the free flowing suspension and the free water from the side of the membrane being sealed. The membrane is then subjected to mild heating to evaporate residual moisture. Preferably the moisture should be evaporated at about 10–70° C., more preferably about 20–70° C. and with a dehumidified gas such as dry air or nitrogen flowing across the wet skin surface. Preferably, vacuum should be applied to the side opposite the skin of the membrane. It is recommended that vacuum not be applied to the wet side of the membrane to expedite moisture removal because this might extract some or all of the uncured caulking particles from the pores. Moisture removal is continued until the surface of the membrane is dry, typically for up to about 4–24 hours.

During removal of residual moisture, the curable polymer of the caulking particles is believed to become crosslinked. Crosslinking renders the polymer rubbery solid and gives the caulking particles fixed shape, thereby permanently causing them to seal the defects. In view that free water is gone from the particles prior to initiation of crosslinking, the functional groups on the curable polymer are ready to react with each other. Functional groups can crosslink with functional groups on the same polymer chain, on a polymer chain other than the same polymer chain or another non-caulking polymer reactive material, e.g., reactive groups on the membrane surface. Depending upon the nature of the crosslinking groups, heat and or catalyst may be utilized to carry out the cross linking reaction. Preferably cross linking takes place at about 25–175° C. and more preferably at about 50–90° C. A flow of air or inert gas, e.g., nitrogen, across the skin being healed of defects during the crosslinking step can be used. To complete the crosslink reaction the membrane is held at cross link temperature for about 10 seconds to about 24 hours, and preferably for about 15 minutes–about 4 hours. Representative catalyzed curable polymer systems suitable for use in this invention include the tin catalyzed siloxane polymer/catalyst system SM2245/SM2146C and the platinum catalyzed siloxane polymer/catalyst system SM3200/3010, (both from General Electric Co.). SM2245 is mixture of hydroxyl terminated dimethyl polysiloxane [formula: $HO-((CH_3)_2SiO)_n-H$ where n>1] and poly (dimethyl siloxane-co-methylhydrogen siloxane) [formula: $-((CH_3)_2SiO)_x(CH_3)HSiO)_y-$ where x>1]. SM2146C contains dioctyltin dineodecanoate. SM3200 is a mixture of (a) trimethylsilyl terminated poly(dimethylsiloxane-co-methylhydrosiloxane), [formula: $(CH_3)_3SiO-((CH_3)_2SiO)_x-(CH_3HSiO)_y-Si(CH_3)_3$ where x and y are each independently >1], (b) vinyl terminated poly (dimethylsiloxane), [formula: $CH_2=CH-((CH_3)_2SiO)_j-(CH_3)_2Si-CH=CH_2$ where j>1], and (c) hydroxy terminated poly(dimethylsiloxane) [formula: $HO-(CH_3SiO)_k-H$ where k>1]. SM3010 contains a platinum catalyst. Tin octate can be used as a catalyst for reactive silicone cable polymers.

Preferably the suspension of caulking particles in water also includes a surfactant. The surfactant is chosen largely for its ability to lower the surface tension of the aqueous medium. While not wishing to be bound by a particular theory, it is proposed that low water surface tension engendered by the surfactant permits the membrane to be dried of water of suspension consistently without densifying the support layer of an asymmetric membrane structures. It has been a persistent problem that evaporating the membrane of water according to conventional fabrication methods often results in collapse of the pores of the support layer immediately adjacent the skin of asymmetric membranes. This collapsing of pores in either monolithic or composite configurations in effect thickens the skin and thus unfavorably increases resistance to transmembrane flux.

Surfactants are also useful for helping to rapidly disperse the caulking particles in the suspension and for maintaining stability of the uniform dispersion. Surfactants can also improve the ability of the suspension fluid to wet the membrane surface.

Surfactants suitable for use with this invention can be anionic, cationic or nonionic types. The surfactants provide a surface tension of less than about 72 dynes/cm, preferably less than about 60 dynes/cm, more preferably less than about 50 dynes/cm and most preferably less than about 45 dynes/cm in water at surfactant concentration of 0.2 wt. % or less. Representative surfactants include cationic quaternary amine, such as "Cirrasol" G-265 available from Uniqema, fluorine-containing surfactants such as Fluorad® FC-129 anionic surfactant having the formula $C_nF_{2n+1}SO_2N(C_2H_5)CH_2CO_2.K+$ (where n≅8) and which is available as a liquid having pH of about 9.5 from 3M Corporation, Fluorad® FC-171 a fluorinated alkyl alkoxylate nonionic surfactant [formula: $CF_3(CF_2)_7SO_2N(C_2H_5)(CH_2CH_2O)_iCH_3$ where i is >1] available from 3M Corporation, and non-fluorinated surfactants such as "Synthrapol" KB nonionic polyoxyethylene alkyl alcohol available from Uniqema, "Triton" X-100 nonionic octylphenoxy polyethoxy ethanol with less than 3% polyethylene glycol, and "Triton" XL-80N nonionic alkyloxy polyethyleneoxy polypropyleneoxy ethanol surfactants available from Dow Chemical Corp. The surfactants can be used individually or in mixtures. Preference is given to Triton X-100, FC-171 surfactants and mixtures thereof.

The concentrations of caulking particles and surfactant in suspension is important to achieving optimum results, i.e., a combination of high permeate gas flux and selectivity after the post treatment. Generally caulking particles are present in dilute concentration because it is desired only to seal the porous defects in the active layer and not to substantially coat the entire layer. Therefore, the caulking particle concentration is kept low enough to avoid building a deep coat of curable polymer on the membrane. However, if the concentration is too low, an insufficient amount of caulking particles will be present to effectively seal the defects. Preferably about 0.10% to about 2.0% caulking particle concentration should be used.

Use of a surfactant is optional to achieve more consistent high performance characteristics (i.e., combined permeance and selectivity) after evaporative drying residual water of suspension. At least about 0.05% surfactant is preferred. An excess of surfactant can be ineffective or lower performance although the reason is not fully understood. Generally at most about 0.25%, preferably at most about 0.15% and more preferably at most about 0.10% surfactant should be used. Concentrations of caulking particles and surfactant referred to herein are weight percent and are based upon total weight of materials in suspension unless otherwise specified.

EXAMPLES

This invention is now illustrated by examples of certain representative embodiments thereof, wherein all parts, proportions and percentages are by weight unless otherwise indicated. All units of weight and measure not originally obtained in SI units have been converted to SI units. Unless otherwise indicated, gas permeance is stated in gas permeation units ("GPU"). One GPU=$10^{-6} \times [cm^3(STP)]/[cm^2 \cdot sec \cdot (cmHg)]$. "STP" means conditions of standard temperature and pressure, i.e., 0° C. and 1 atmosphere, respectively.

Surface tension of fluids in the examples were measured with a Cahn Dynamic Contact Angle Analyzer model DCA-312 using the Wilhelmy plate technique. The plate was a microscope slide cover glass of nominal 30 mm width and 0.2 mm thickness dimensions. The plate and a petri dish used to hold the liquid being tested were cleaned with a propane flame before making a measurement The plate was moved at 20 $\mu$m/sec. Advancing and receding forces were measured as a function of immersion depth of the plate as it moved vertically through the liquid. Surface tension was calculated using the formula:

$$F = p\gamma\cos\theta - \rho g A d$$

in which
F=force
p=plate perimeter
γ=surface tension
θ=contact angle
ρ=liquid density
g=gravitational constant
A=cross section area of the plate, and
d=depth of plate in liquid.

Reference Example 1

Fabrication of Hollow Fiber Membranes

Composite asymmetric hollow fiber gas separation membranes were prepared in the following manner. A polymer blend (32.5%), $CaBr_2$ (2.3%), $LiNO_3$ (0.16%) and tetramethylenesulfone ("TMS" 6.5%) were dissolved in NMP (58.54%) to form a core solution. The polymer blend was a 90:10 weight ratio of Ultem® 1000 polyetherimide (General Electric Co.) and Matrimid® 5218 polyimide (Vantico, Inc.), respectively. A sheath solution was prepared from 26.0% Matrimid 5218 polyimide, 7.8% TMS, 1.3% acetic anhydride, 0.26% acetic acid and 64.64% NMP. A bore fluid of 90:10 by weight NMP:water was utilized. The solutions and bore fluid were processed through a composite hollow fiber spinnerette. Referring to the design of the spinnerette die disclosed in U.S. Pat. No. 5,320,512, the disclosure of which is hereby incorporated by reference herein, the spinnerette die had tube 18 outer diameter and orifice 26 inner diameters of 254 $\mu$m and 559 $\mu$m, respectively. The core polymer solution was extruded at a rate of 105 $cm^3$/hr and the sheath polymer solution was simultaneously coextruded at 12.5 $cm^3$/hr. The core and sheath were extruded with the spinnerette temperature controlled at 80° C. The bore fluid was discharged through the nozzle of the spinnerette at 46.6 $cm^3$/hr for fiber Ca and 48.5 $cm^3$/hr for fiber Cb. Nascent fiber filament traveled through an air gap of 4.0 cm (fiber Ca) and 3.5 cm (fiber Cb) at room temperature and was then immersed in water maintained at 27° C. which coagulated the polymer of the filament. It was then wound up at linear velocity of 90 m/min such that the draw ratio (i.e., take up velocity divided by average extrusion velocity) was 8.9. The solidified water-wet fiber was washed with running water at 50° C. for about 12 hours and dehydrated by organic liquid substitution methods as taught in U.S. Pat. Nos. 4,080,744 and 4,120,098, the disclosures of which are hereby incorporated by reference herein, in which the water was replaced by methanol which, in turn, was replaced by hexane. The fibers were finally dried of hexane by evaporation. The fibers thus produced had a bore diameter of 90 $\mu$m and an outer diameter of 160 $\mu$m.

Reference Example 2

Fabrication of Gas Separation Modules

A module containing 360 composite asymmetric hollow fiber membranes produced as in Reference Example 1 are fabricated. The fibers were potted at both ends in a 1.27 cm diameter stainless steel case to provide active fiber length of 40.6 cm. Permanence and selectivity of the fiber membranes were determined by the following technique. Ambient concentration air was continuously fed at 689 KPa gauge (100 psig) pressure into the feed end, conducted through the bores of the fibers. Retentate was discharged from the far end of the tube side of the module. Oxygen enriched permeate was discharged from the shell side at a port near the feed end of the module so that the gas separation operated in counter-current flow mode. The oxygen concentrations of the discharged permeate and retentate gas mixtures were monitored periodically with a Neutronics portable oxygen sensor. Flow rates of permeate and retentate were measured with bubble flow meters. Retentate flow was throttled with an adjustable valve to obtain a goal oxygen concentration. For post treated and non-post treated samples, the goal oxygen concentrations were about 5 mole % and 10–15 mole %, respectively.

Utilizing data obtained by this procedure, permeance ("P/l") of oxygen and nitrogen were independently calculated by the formula:

$$P/l=(Q/A)/\Delta p$$

in which
P=Permeability of active layer
l=effective thickness of active layer
Q=volume flow rate
A=membrane surface area
Δp=differential pressure across membrane Accordingly, the $O_2/N_2$ selectivity ("α") was calculated by dividing the permeance of oxygen by that of nitrogen.

Reference Example 3

Post Treatment With Water Only

Two gas separation modules (30-9 and 30-10) were prepared as described in Reference Example 2 using Ca fibers and were tested for oxygen permeance and oxygen/nitrogen selectivity. At initial determination, the fibers were in condition as produced in Reference Example 1. The fibers were repeatedly subjected to post treatment with deionized water by pouring the water into the shell side of the modules and allowing water to continue in contact with the shell side of the fibers for 15 minutes while a vacuum of 25 cm (10 inch) Hg was drawn on the tube side. Thereafter, flowing liquid was drained from the module shell side. For 24 hours nitrogen was then blown through the shell side and about 51–74 cm (20–29 inches) Hg vacuum was drawn on the tube side to dry residual water from the membrane. Final drying was accomplished by placing the module in a convection oven at 70° C. for 24 hours with nitrogen sweeping through the shell side. After each post treatment, P/l and α were each determined. Results are presented in Table I.

Data of Table I show that oxygen permeance decreased after each water post-treatment. This is mainly attributed to collapse of the pores in the skin and support layers of the asymmetric sheath of the composite membranes. This shrinkage densified the layers causing increased resistance and decreased flow. Shrinkage is also thought to partially seal some of the defects in the skin of the sheath. This accounts for a slight increasing trend of selectivity after repeated water post treatments.

TABLE I

|  | (30-9) | | (30-10) | |
| --- | --- | --- | --- | --- |
|  | P/I $O_2$ (GPU) | α $O_2/N_2$ | P/I $O_2$ (GPU) | α $O_2/N_2$ |
| Pre-treatment | 202.89 | 1.83 | 189.18 | 1.81 |
| Post-treatment 1 | 129.08 | 2.12 | 121.83 | 2.03 |
| Post-treatment 2 | 109.24 | 2.29 | 97.85 | 2.27 |
| Post-treatment 3 | 95.86 | 2.31 | 99.17 | 1.91 |
| Post-treatment 4 | 83.06 | 2.21 | 93.91 | 2.08 |
| Post-treatment 5 | 77.85 | 2.58 | 85.41 | 2.11 |

Examples 1–4

Post-treatment—Various Concentrations of Reactive Silicone Polymer SM2059

Multiple membrane modules were prepared as in Reference Example 2 using composite hollow fiber Ca asymmetric membranes as described in Reference Example 1. Each module as produced and prior to any post-treatment procedure to seal porous defects was analyzed for oxygen permeance and oxygen/nitrogen selectivity. Permeance of oxygen and nitrogen were each determined as described in Reference Example 2.

Fibers of the modules were post-treated to seal defects in the outer dense skin of the sheath component. Suspensions of 0.25, 0.50, 0.75 and 1.00% of SM2059 stock in deionized water were prepared by diluting liquid SM2059 stock with deionized water and shaking the mixture vigorously by hand for a few minutes at room temperature. SM2059stock contained about 35–41% polymer. Suspensions were poured into and allowed to stand in the shell side of the modules and were maintained in contact with the shell side of the fibers for 15 minutes while a vacuum of 25 cm (10 inch) Hg was drawn on the tube side. Thereafter, flowing liquid was drained from the module shell side. For 24 hours nitrogen was then blown through the shell side and about 51–74 cm (20–29 inches) Hg vacuum was drawn on the tube side to dry residual water from the membrane. Final drying was accomplished by placing the module in a convection oven at 70° C. for 24 hours with nitrogen sweeping through the shell side. Following post treatment, permeance of oxygen and oxygen/nitrogen selectivity were again determined. Multiple modules were tested at each test condition. Results are presented in Table II.

It is seen from these data that SM2059 stock of about 0.75 to 1.0% provided excellent selectivity of about 6.5 and approaching the intrinsic selectivity of the membrane polymer of about 7. At lower concentrations some high selectivity values were achieved but the consistency was variable. This suggests that too little sealing of defects occurred at the lower concentrations. In all cases after post treatment there were significant reductions of oxygen permeance from the non-post treated membrane values. This shows that considerable pore collapse of the support layer had occurred. However, a further trend is evident of decreasing post treated permeance with increasing caulking particle concentration. One might infer that the caulking polymer developed a coating on the active layer which hindered transmembrane flow.

TABLE II

|  |  | As produced | | Post treated | |
| --- | --- | --- | --- | --- | --- |
| Example | % SM2059[1] | P/I $O_2$ (GPU) | α $O_2/N_2$ | P/I $O_2$ (GPU) | α $O_2/N_2$ |
| 1 | 0.25 | 171.67 | 1.79 | 29.62 | 5.17 |
|  |  | 152.34 | 1.85 | 28.59 | 3.85 |
|  |  | 164.14 | 1.71 | 19.51 | 6.51 |
| 2 | 0.50 | 156.40 | 1.74 | 34.29 | 2.49 |
|  |  | 164.63 | 1.83 | 19.28 | 6.46 |
| 3 | 0.75 | 193.88 | 1.92 | 17.94 | 6.36 |
|  |  | 179.05 | 1.94 | 16.25 | 6.60 |
| 4 | 1.00 | 152.32 | 2.08 | 10.54 | 6.85 |
|  |  | 169.41 | 2.02 | 10.41 | 6.58 |
|  |  | 149.63 | 1.89 | 13.54 | 6.88 |
|  |  | 161.88 | 1.58 | 14.30 | 6.99 |

[1]stock suspension of 35–41% solids in suspension, (e.g., 0.75% stock suspension of 35–41% solids contained about 0.28% SM2059 solids).

Examples 5–11 and Comparative Examples 1–5

Post Treatment With Curable Polymer and Various Types and Amounts of Surfactants in Suspension Modules of asymmetric membrane composite hollow fibers as described in Reference Examples 1 and 2 were prepared and post treated to seal defects according to the general procedure described in Examples 1–4. Cb fibers were used. Post treatment conditions for Example 5 were the same as those of Example 3, that is, SM2059 polymer at concentration of 0.75% (of 35–41% stock suspension) was dispersed with water to form the post treatment suspension. In each of Examples 6–11 a different surfactant at a concentration as shown in Table III was added with the SM2059 to water and the mixture was shaken by hand to thoroughly disperse the additives. The concentration of SM2059 stock suspension was 0.75% in all of these operative examples. Permeance of oxygen and oxygen/nitrogen selectivity were determined before and after post treatment. Results are also presented in Table III.

Comparative Example 1 was also post treated using 0.75% stock suspension SM2059 polymer in the post treatment suspension. However, post treated permeance was more than about three times that of Ex. 5, however the oxygen/nitrogen selectivity was quite poor. This is thought to be caused by the anionic surfactant being of the opposite ionic state to that of polymer suspension free of surfactant.

adding appropriate surfactant generally provides high selectivities on par with those obtained in Example 5 (no surfactant). Quite beneficially, the oxygen permeance with surfactant added to post treatment is considerably enhanced. These results are thought to imply that surface tension reduction obtained by using a suitable surfactant in proper concentration reduces densification of the support layer when the membrane is dried.

Post treatment suspensions of Comparative Examples 2 and 3 was the same as Ex. 10 except that no polymer was included in the suspension. In comparison to Ex. 10, these show that at the same or even 2.5 times the concentration of operative surfactant value, selectivity is unacceptably lower than 6. Comparative Examples 4 and 5 utilized a different surfactant and also did not employ a polymer. This demonstrates that surfactant alone was unable to adequately seal defects in the membranes and confirm the need to include a curable polymer in the post treatment suspension to obtain a good combination of permeance and selectivity.

TABLE III

| | Polymer | Surfactant | | | As produced | | Post treated | |
|---|---|---|---|---|---|---|---|---|
| | SM2059 (%)[1] | Name | Type | Conc. (%) | P/1 $O_2$ (GPU) | α $O_2/N_2$ | P/1 $O_2$ (GPU) | α $O_2/N_2$ |
| Ex. 5 | 0.75 | — | — | 0 | 304.70 | 1.27 | 14.89 | 6.77 |
| Comp. Ex.1 | 0.75 | FC-129 | anionic | 0.25 | 293.26 | 1.31 | 13.73 | 6.69 |
| | | | | | 379.04 | 1.34 | 42.66 | 2.92 |
| Ex.6 | 0.75 | Synthrapol KB | nonionic | 0.06 | 267.43 | 1.49 | 36.26 | 4.08 |
| | | | | | 288.22 | 1.40 | 18.66 | 6.33 |
| Ex.7 | 0.75 | Synthrapol KB | nonionic | 0.12 | 294.79 | 1.46 | 19.19 | 6.47 |
| | | | | | 326.02 | 1.42 | 20.19 | 6.28 |
| Ex.8 | 0.75 | Synthrapol KB | nonionic | 0.25 | 297.38 | 1.24 | 19.61 | 6.29 |
| | | | | | 295.33 | 1.51 | 18.03 | 6.48 |
| Ex.9 | 0.75 | XL-80N | nonionic | 0.03 | 294.64 | 1.40 | 16.90 | 6.14 |
| | | | | | 305.32 | 1.32 | 16.64 | 6.42 |
| Ex.10 | 0.75 | FC-171 | nonionic | 0.10 | 260.84 | 1.38 | 18.54 | 6.13 |
| | | | | | 324.21 | 1.45 | 33.91 | 5.94 |
| | | | | | 323.23 | 1.47 | 31.25 | 6.26 |
| Comp. Ex. 2 | 0.00 | FC-171 | nonionic | 0.10 | 295.30 | 1.49 | 32.02 | 6.37 |
| | | | | | 272.32 | 1.31 | 78.29 | 1.89 |
| Comp. Ex.3 | 0.00 | FC-171 | nonionic | 0.25 | 259.96 | 1.40 | 78.38 | 2.02 |
| | | | | | 168.99 | 1.82 | 48.56 | 2.65 |
| Ex.11 | 0.75 | X-100 | nonionic | 0.12 | 189.59 | 1.79 | 53.17 | 3.59 |
| | | | | | 285.84 | 1.32 | 24.95 | 6.43 |
| Comp. Ex. 4 | 0.00 | X-100 | nonionic | 0.12 | 315.27 | 1.26 | 24.31 | 6.38 |
| | | | | | 288.79 | 1.38 | 41.53 | 3.39 |
| Comp. Ex.5 | 0.00 | X-100 | nonionic | 0.03 | 283.70 | 1.42 | 40.39 | 3.84 |
| | | | | | 262.51 | 1.54 | 39.18 | 2.65 |

[1]stock suspension of 35–41% solids in suspension

The surfactant should either be nonionic or the same ionic state (i.e., cationic or anionic, as the case may be) of the polymer suspension to obtain both high permeance and selectivity.

Examples 6–8 demonstrate that post treatment with SM2059 in combination with 0.06–0.25% Synthrapol KB nonionic surfactant provided unproved permeance and comparable selectivity in relation to Ex. 5. Examples 9–11 also show that SM2059 polymer in combination with diverse other nonionic surfactants at various surfactant levels gave often very high permeance and excellent selectivity. A dense film, that is, an ideal membrane, of the polymer used in these examples has an oxygen/nitrogen selectivity of about 7. Typical selectivity of commercial quality hollow fiber membranes is about 4.5. Therefore, selectivities of about 6 or above for membranes treated by the novel post treatment process are deemed to be quite good. The data thus show that Examples 12–19 and Comparative Example 6

Post Treatment of Composite Asymmetric Hollow Fiber Membranes With Various Concentrations of Selected Surfactants Modules of asymmetric membrane composite hollow fibers as described in Reference Examples 1 and 2 were prepared and post treated to seal defects according to the general procedure described in Examples 1–4. Fibers Cb were used. The oxygen permeance and oxygen/nitrogen selectivity was measured as produced and after treatment. The modules were independently post treated with an aqueous suspension containing SM2059 curable polymer at 0.75% concentration of 35–41% stock suspension and either Triton X-100 or Fluorad FC-171 nonionic surfactants at various concentrations. As seen in Table III, these combinations of curable polymer and surfactants in the post treatment suspensions provided excellent oxygen/nitrogen selectivities and superior permeance values. Results are shown in Table IV. For convenience, the data of Example 5 in which suspension contained SM2059 but no surfactant is also reproduced in Table IV.

The data of Table IV show that for each of the two surfactants tested an optimum performance range exists of about 0.03–0.12% surfactant in suspension. For surfactant X-100, Exs. 12–17 demonstrate that up to 0.5% surfactant yielded membranes with excellent selectivity and much higher permeance compared to the polymer-only sample of Ex. 5. There is a trend that higher concentrations of surfactant tend to produce lower post treated permeance values. At 1.0% X-100 surfactant the post treated permeance is about the same as that of Ex. 5. The same general behavior is seen in Exs. 18 and 19, with respect to surfactant FC-171. In these membranes the selectivity was deemed acceptably high and the permeance was much improved relative to Ex. 5. Comparative Ex. 6 shows that increasing the surfactant concentration up to 0.2% adversely affected the selectivity.

Examples 20–21 and Comparative Example 7

Post Treatment of Asymmetric Membranes With a Blend of Curable Polymers

Modules of asymmetric membrane composite hollow fibers as described in Reference Examples 1 and 2 were prepared and post treated to seal defects according to the general procedure described in Examples 1–4. The oxygen permeance and oxygen/nitrogen selectivity was measured as produced and after treatment. After production, the modules were independently post treated with an aqueous suspension containing a blend of diamino/alkoxy reactive silicone polymer ATM1322M50 and amine functional silicone polymer SM2059 as the curable polymer component. No surfactant was added for these trials. Oxygen permeance and oxygen/nitrogen selectivity were measured both before and after post treatment as described above and results are presented in Table IV. This provided both excellent selectivity and enhanced permeance.

TABLE IV

| | Polymer Name | Surfactant Name | Conc. (%) | As produced P/1 $O_2$ (GPU) | $\alpha O_2/N_2$ | Post treated P/1 $O_2$ (GPU) | $\alpha O_{2/N2}$ |
|---|---|---|---|---|---|---|---|
| Ex.5 | SM2059 | — | 0.00 | 304.70 | 1.27 | 14.89 | 6.77 |
| Ex.12 | SM2059 | X-100 | 0.03 | 293.26 | 1.31 | 13.73 | 6.69 |
| | | | | 303.99 | 1.40 | 26.95 | 5.97 |
| Ex.13 | SM2059 | X-100 | 0.06 | 255.02 | 1.29 | 24.07 | 6.58 |
| | | | | 306.56 | 1.26 | 23.82 | 6.50 |
| Ex. 14[a] | SM2059 | X-100 | 0.12 | 303.59 | 1.27 | 24.07 | 6.43 |
| | | | | 285.84 | 1.32 | 24.95 | 6.43 |
| Ex.15 | SM2059 | X-100 | 0.25 | 315.27 | 1.26 | 24.31 | 6.38 |
| | | | | 345.58 | 1.25 | 23.45 | 6.19 |
| Ex.16 | SM2059 | X-100 | 0.50 | 336.86 | 1.29 | 20.71 | 6.04 |
| | | | | 304.88 | 1.43 | 20.33 | 6.26 |
| Ex.17 | SM2059 | X-100 | 1.00 | 328.97 | 1.41 | 22.10 | 6.40 |
| | | | | 311.80 | 1.40 | 15.47 | 6.20 |
| | | | | 330.68 | 1.33 | 17.40 | 5.89 |
| Ex.18 | SM2059 | FC-171 | 0.05 | 297.04 | 1.25 | 31.63 | 5.86 |
| Ex. 19[b] | SM2059 | FC-171 | 0.10 | 298.00 | 1.36 | 30.08 | 5.89 |
| | | | | 324.21 | 1.45 | 33.91 | 5.94 |
| Comp. Ex.6 | SM2059 | FC-171 | 0.20 | 323.23 | 1.47 | 31.25 | 6.26 |
| | | | | 295.30 | 1.49 | 32.02 | 6.37 |
| | | | | 349.49 | 1.32 | 33.16 | 3.84 |
| Ex.20 | 0.375% SM2059 + 0.375% ATM1322M50 | — | 0.00 | 265.47 | 1.29 | 31.94 | 4.06 |
| | | | | 318.21 | 1.25 | 33.90 | 3.78 |
| | | | | 312.69 | 1.26 | 35.19 | 3.37 |
| | | | | 333.63 | 1.30 | 31.93 | 5.91 |
| | | | | 291.23 | 1.51 | 28.57 | 6.04 |

[a]Same as Ex.11
[b]Same as Ex.10

Figure 1:
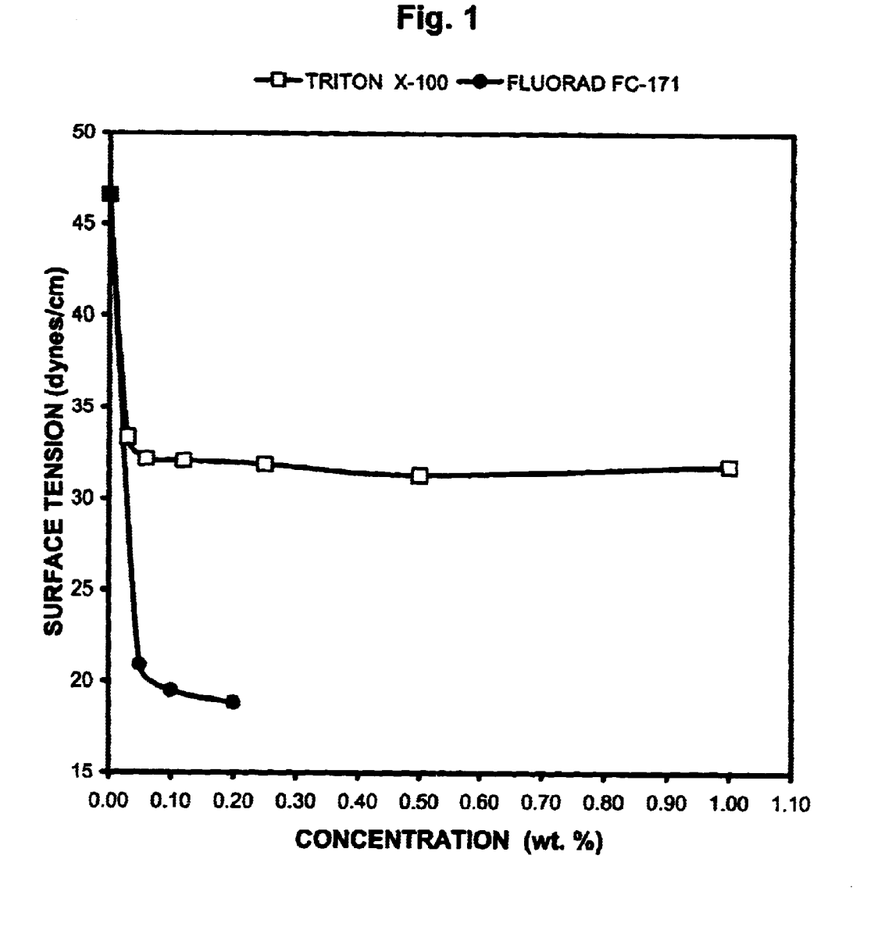
FIG. 1 is a plot of surface tension of a suspension in water of 0.75% SM2059 stock of 35–41 wt. % curable polymer particles as a function of concentration of Triton® X-100 and Fluorad® FC-171 surfactants added to the suspension.

FIG. 1 is a plot of surface tension of a 0.75% of a 35–41% stock suspension of SM2059 as a function of surfactant concentration for each of Triton X-100 and Fluorad FC-171 surfactants. The figure shows that surface tension drops precipitously with addition of small amounts (up to about 0.05%) of surfactant. Surface tension continues to reduce gradually between 0.05–0.12% and then levels. This implies that at least about 0.03–0.12% surfactant is desirable to have surface tension lowering effect but that excess surfactant does not change surface tension. It seems that after an effective maximum surfactant concentration is reached, the surfactant dominates the suspension and begins to adversely affect the ability of the caulking particles to seal defects in the membrane skin.

Although specific forms of the invention have been selected for illustration in the drawings and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:
1. A gas separation membrane having an asymmetric structure defined by a dense selectively gas permeable active layer comprising sealed porous defects the membrane being formed by a method comprising providing a suspension comprising caulking particles of a curable polymer dispersed in an aqueous solution, contacting a portion of the membrane having porous defects with the suspension, removing water from the suspension, and heating the caulking particles and membrane to an elevated temperature for a duration effective to cure the polymer, thereby causing the polymer to seal the porous defects.

2. The gas separation membrane of claim 1 in which the membrane is a hollow fiber defining an annular cross section comprising a porous support layer radially adjacent to the active layer, and in which the active layer comprises a polyimide or copolyimide, the curable polymer comprises a reactive silicone polymer and the suspension comprises a non-ionic surfactant selected from the group consisting of FC-171 (fluorinated alkyl alkoxylate) Triton X-100 (octylphenoxy polyethoxy ethanol) and a mixture thereof.

3. The gas separation membrane of claim 1 in which the step of removing water comprises drying the membrane directly from water wet state to a dry state and excludes replacing the water with a non-aqueous liquid prior to drying the membrane to the dry state.

4. A method of repairing porous defects in a selectively gas permeable portion of a gas separation membrane comprising providing a suspension comprising caulking particles of a curable polymer dispersed in an aqueous solution, contacting the portion of the membrane having the porous defects with the suspension, removing water of the suspension from the membrane, and heating the caulking particles and membrane to an elevated temperature for a duration effective to cure the polymer, thereby causing the polymer to seal the porous defects.

5. The method of claim 4 in which the selectively gas permeable portion comprises a polyimide and the curable polymer comprises a reactive silicone polymer.

6. The method of claim 5 in which the curable polymer is present in the suspension at a concentration of about 0.2–1.0 wt. %.

7. The method of claim 4 in which the contacting step further comprises applying a pressure gradient across the suspension and membrane effective to drive the caulking particles proximate to the porous defects.

8. The method of claim 7 which comprises at least one of (a) applying suction through the membrane from a side of the membrane opposite the portion having the porous defects and (b) pressurizing the suspension on a side of the membrane having the porous defects.

9. The method of claim 4 in which the gas separation membrane is an asymmetric hollow fiber having an annular cross section comprising a porous support layer and a substantially nonporous selectively gas permeable active layer radially adjacent to the support layer and in which the step of removing water comprises drying the membrane directly to a dry state without replacing the water with a non-aqueous liquid prior to obtaining the membrane in the dry state.

10. The method of claim 9 in which the suspension has a surface tension such that flux of oxygen through the membrane in the dry state is at least 20 gas permeation units.

11. The method of claim 9 in which removing the water comprises evaporating the water at a temperature above about 50° C.

12. The method of claim 4 which comprises adding an effective amount of a surfactant to the suspension to provide the membrane with a permeance to a compound for which the membrane is selectively permeable that exceeds the permeance to the compound achieved by the membrane produced without adding the surfactant.

13. The method of claim 12 in which the surfactant is a non-ionic surfactant.

14. The method of claim 13 in which the surfactant is selected from the group consisting of FC-171 (fluorinated alkyl alkoxylate), Triton X-100 (octylphenoxy polyethoxy ethanol) and a mixture thereof.

15. The method of claim 14 in which the selectively gas permeable active layer comprises a polyimide or copolyimide, and the suspension comprises an amine functional silicone polymer present at a concentration of about 0.2–1.0 wt. %.

16. The method of claim 15 in which the suspension comprises about 0.3 wt. % of amine functional silicone.

* * * * *